(12) United States Patent
Takahashi

(10) Patent No.: US 10,220,583 B2
(45) Date of Patent: Mar. 5, 2019

(54) METHOD AND DEVICE FOR MANUFACTURING TIRE VULCANIZATION BLADDER ASSEMBLY

(71) Applicant: The Yokohama Rubber Co., LTD., Minato-ku, Tokyo (JP)

(72) Inventor: Yukihisa Takahashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/756,035

(22) PCT Filed: Aug. 29, 2016

(86) PCT No.: PCT/JP2016/075195
§ 371 (c)(1),
(2) Date: Feb. 27, 2018

(87) PCT Pub. No.: WO2017/038765
PCT Pub. Date: Mar. 9, 2017

(65) Prior Publication Data
US 2018/0250900 A1 Sep. 6, 2018

(30) Foreign Application Priority Data
Sep. 4, 2015 (JP) .................................. 2015-174938

(51) Int. Cl.
*B29D 30/06* (2006.01)
*B29C 33/02* (2006.01)
(Continued)

(52) U.S. Cl.
CPC .......... *B29D 30/0654* (2013.01); *B29C 33/02* (2013.01); *B29C 33/3842* (2013.01); *B29C 35/02* (2013.01); *B29D 2030/0659* (2013.01)

(58) Field of Classification Search
CPC ........ Y10T 29/49538; Y10T 29/49904; B29D 30/0654; B29D 2030/0659
See application file for complete search history.

(56) References Cited

U.S. PATENT DOCUMENTS 6,402,491 B1    6/2002  Goto
2009/0117217 A1  5/2009  Ichimaru

FOREIGN PATENT DOCUMENTS

JP    2000-326330    11/2000
JP    2010-089474     4/2010
(Continued)

OTHER PUBLICATIONS

English Translation JP2013107282 (Year: 2013).*
International Search Report for International Application No. PCT/JP2016/075195 dated Nov. 15, 2016, 3 pages, Japan.

*Primary Examiner* — Jason L Vaughan
*Assistant Examiner* — Amanda J Meneghini
(74) *Attorney, Agent, or Firm* — Thorpe North & Western

(57) ABSTRACT

A tire vulcanization bladder assembly is manufactured by placing a first ring part on a base stage installed on leg parts in a periphery of a first end opening of a bladder; sandwiching a first clamp part of the bladder, the bladder being in an upright position with the first clamp part on a lower side and a second clamp part located in a periphery of a second end opening of the bladder on an upper side, by the first ring part, thereby attaching the first ring part to the bladder; inserting an inside ring member of a second ring part into the bladder from above on an inside ring member of the first ring part; moving the inside ring member of the second ring part upward relative to the bladder to a position of the second clamp part; and attaching the second ring part to the second clamp part.

18 Claims, 11 Drawing Sheets

(51) Int. Cl.
    *B29C 35/02* (2006.01)
    *B29C 33/38* (2006.01)

(56) References Cited

FOREIGN PATENT DOCUMENTS

| | | |
|---|---|---|
| JP | 2013-107282 | 6/2013 |
| JP | 2014-117929 | 6/2014 |
| WO | WO 2007/043550 | 4/2007 |

\* cited by examiner

METHOD AND DEVICE FOR MANUFACTURING TIRE VULCANIZATION BLADDER ASSEMBLY

TECHNICAL FIELD

The present technology relates to a method and device for manufacturing a tire vulcanization bladder assembly, and more particularly relates to a method and device for manufacturing a tire vulcanization bladder assembly whereby assembly and manufacturing operation is facilitated and the productivity of the bladder assembly is enhanced without the use of large-scale equipment.

BACKGROUND ART

In the vulcanization process, a green tire is disposed within a tire mold installed in a vulcanizer, and a bladder for tire vulcanization is inserted into the green tire in a deflated state. Then, a heating medium and a pressurizing medium are injected into the bladder with a mold in a closed state to expand the bladder and vulcanize the green tire.

The bladder has a cylindrical shape with relatively thick clamps parts positioned around the periphery of two end openings of the bladder. In order to assemble this bladder into the vulcanizer, a bladder assembly is manufactured with the clamp parts sandwiched between ring parts.

In the related art, to manufacture the bladder assembly, first, the bladder is set in an upright position with the two end openings being on the upper side and the lower side, and a ring part is attached to one of the clamp parts located on the upper side. Next, the bladder is inverted vertically so that the other clamp part is on the top side. Then, the ring part is attached by sandwiching the clamp part on the other side, to complete the bladder assembly. The ring parts are made of metal and have corresponding weight, thus, inverting the bladder vertically requires a lot of labor and time.

Thus, a bladder inversion device has been proposed in order to reduce the labor and increase the operational efficiency of the bladder inversion operation (for example, see Japanese Unexamined Patent Publication No. 2010-89474). However, the proposed inversion device includes a mechanism for inverting the bladder vertically, so the device is correspondingly large, and a strong driving force is needed. Thus, there is a problem that the inversion device is large-scale. Also, vertically inverting the bladder itself requires a certain amount of time, and this is a hindrance to improving the productivity of the bladder assembly.

SUMMARY

The present technology provides a method and device for manufacturing a tire vulcanization bladder assembly whereby assembly and manufacturing operation is facilitated and the productivity of the bladder assembly is enhanced without the use of large-scale equipment.

The present technology provides a method of manufacturing a tire vulcanization bladder assembly in which a first ring part including an inside ring member and an outside ring member is attached to a bladder for tire vulcanization by sandwiching a first clamp part formed in a periphery of a first end opening of the bladder with the first ring part, and a second ring part including an inside ring member and an outside ring member is attached to the bladder by sandwiching a second clamp part formed in a periphery of a second end opening of the bladder with the second ring part. The method includes: placing the first ring part on a base stage installed on leg parts; attaching the first ring part to a first clamp part of the bladder, the bladder being in an upright position with the first clamp part on a lower side and a second clamp part on an upper side; inserting and placing the inside ring member of the second ring part into the bladder from above on the inside ring member of the first ring part; moving the inside ring member of the second ring part upward relative to the bladder such that the inside ring member of the second ring part is disposed at a position of the second clamp part; and attaching the second ring part to the second clamp part.

The device for manufacturing a tire vulcanization bladder assembly according to the present technology is a device for manufacturing a tire vulcanization bladder assembly in which a first clamp part at a periphery of a first end opening of a bladder for tire vulcanization is sandwiched by a first ring part that includes an inside ring member and an outside ring member such that the first ring part is attached to the bladder, and, a second clamp part formed at a periphery of a second end opening of the bladder is sandwiched by a second ring part that includes an inside ring member and an outside ring member such that the second ring part is attached to the bladder. The device includes: a base stage installed on leg parts; and a support member disposed in a central portion of the base stage in plan view. The base stage and the support member are configured to be capable of moving vertically relative to each other. The device for manufacturing a bladder assembly is configured such that the first ring part placed on the base stage is attached to the first clamp part of the bladder in an upright position with the first clamp part on a lower side and the second clamp part on an upper side; the inside ring member of the second ring part is placed on the inside ring member of the first ring part and supported by the support member; the inside ring member of the second ring part is configured to move upward relative to the bladder to a position of the second clamp part; and the second ring part is attached to the second clamp part.

According to the present technology, the bladder assembly can be manufactured without vertically inverting the bladder. This is achieved by attaching the first ring part to the first clamp part of the bladder for tire vulcanization, the bladder being in an upright position with the first clamp part on the lower side and the second clamp part on the upper side; inserting and placing the inside ring member of the second ring part into the bladder from above on the inside ring member of the first ring part; moving the inside ring member of the second ring part upward relative to the bladder and disposing the inside ring member of the second ring part at the position of the second clamp part; and by attaching the second ring part to the second clamp part. Thus, the assembly and manufacturing operation is facilitated and productivity of the bladder assembly is enhanced without the use of large-scale equipment.

DETAILED DESCRIPTION

Figure 1:
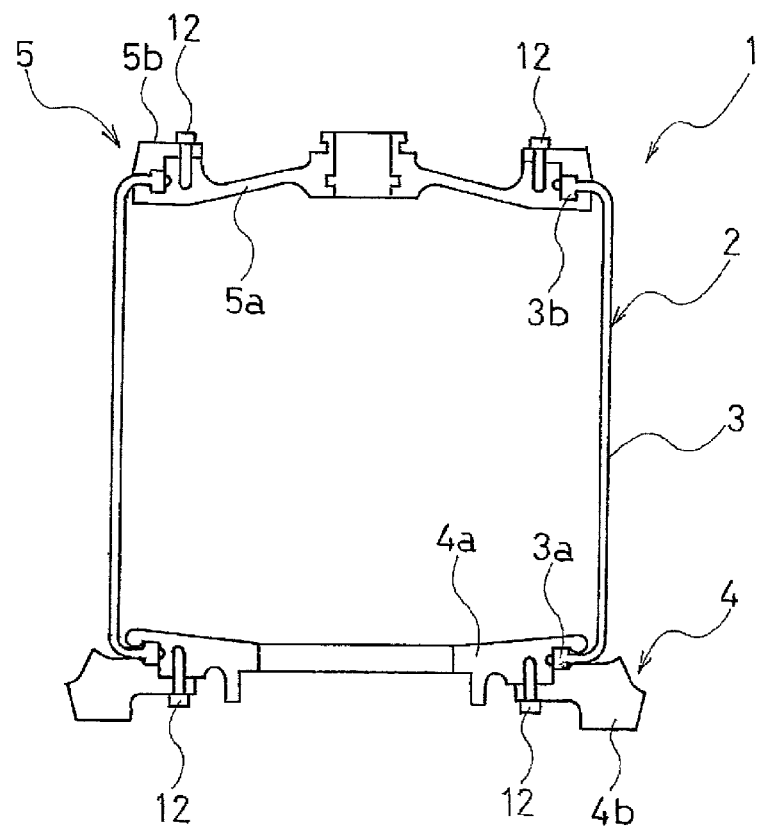
FIG. 1 is an explanatory diagram illustrating a bladder assembly manufactured according to the present technology as viewed in a vertical cross-section.

The method and device for manufacturing a tire vulcanization bladder assembly according to the present technology will be described below based on embodiments illustrated in the drawings.

Figure 2:
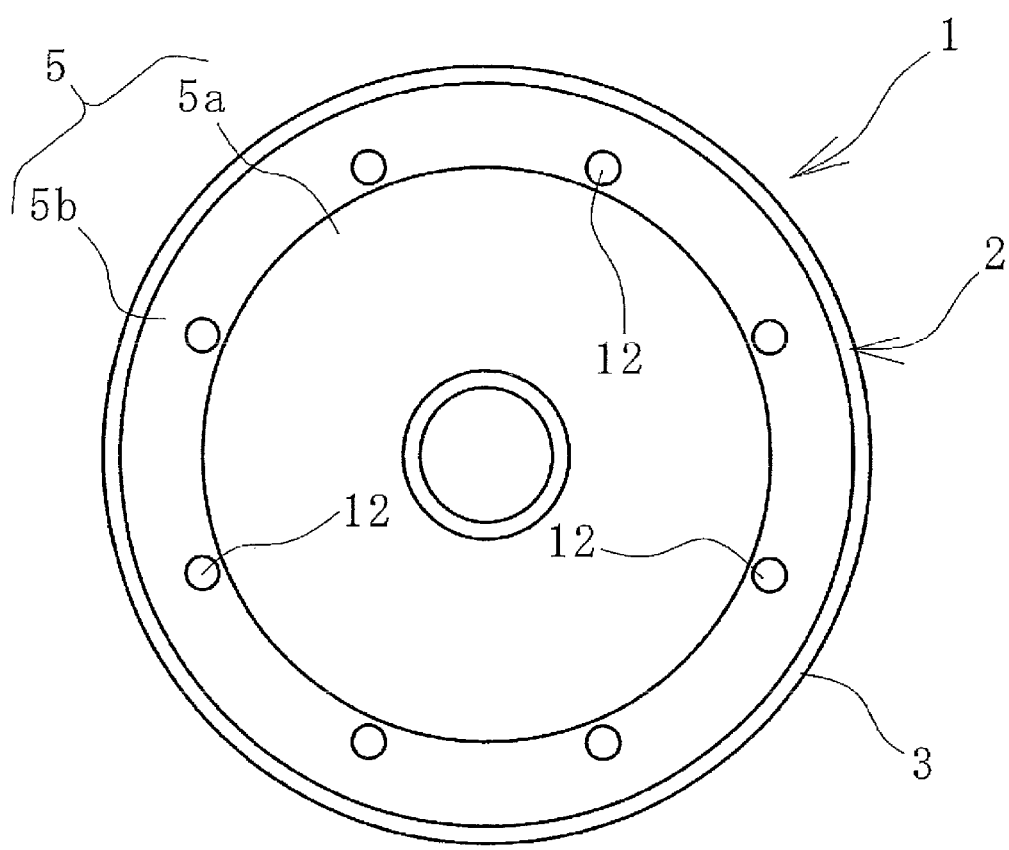
FIG. 2 is an explanatory diagram illustrating the bladder assembly in FIG. 1 in a plan view.

A tire vulcanization bladder assembly 1 (hereafter referred to as bladder assembly 1) as illustrated in FIGS. 1 and 2 is manufactured in accordance with the present technology. The bladder assembly 1 includes a bladder 2 for tire vulcanization made of rubber (hereafter referred to as the bladder 2), and a first ring part 4 and a second ring part 5 made of metal.

The bladder 2 has a cylindrical shape, a toric first clamp part 3a formed at a periphery of a first end opening in a cylinder axial direction of a cylindrical portion 3, and a toric second clamp part 3b formed at a periphery of a second end opening. The first clamp part 3a and the second clamp part 3b are thick relative to a wall thickness of the cylindrical portion 3. The wall thickness of the cylindrical portion 3 varies depending on the size and the like of the tire to be vulcanized, but for example, in the case of a bladder 2 for vulcanizing a tire for a passenger vehicle, the wall thickness of the cylindrical portion 3 is 3 mm or greater and 6 mm or less, and the thickness of the first clamp part 3a and the second clamp part 3b is, for example, 20 mm or greater and 25 mm or less. In the case of a bladder 2 for vulcanizing a tire for a truck or bus, the wall thickness of the cylindrical part 3 is, for example, 5 mm or greater and 12 mm or less, and the thickness of the first clamp part 3a and the second clamp part 3b is, for example, 24 mm or greater and 30 mm or less. The first ring part 4 and the second ring part 5 are attached to the first clamp part 3a and the second clamp part 3b respectively in order to assemble the bladder 2 into the vulcanizer.

The first ring part 4 includes a toric inside ring member 4a and a toric outside ring member 4b. The first clamp part 3a is sandwiched between the inside ring member 4a and the outside ring member 4b, and they are integrated by fixing bolts 12.

The second ring part 5 includes a disc-shaped inside ring member 5a and a toric outside ring member 5b. The second clamp part 3b is sandwiched between the inside ring member 5a and the outside ring member 5b, and they are integrated by the fixing bolts 12.

Figure 3:
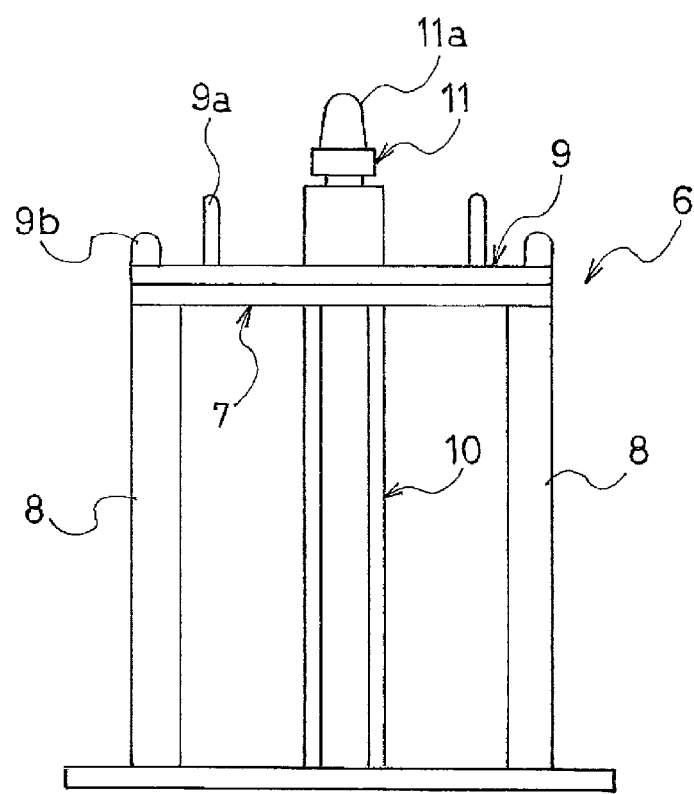
FIG. 3 is an explanatory diagram illustrating a bladder assembly manufacturing device according to the present technology as viewed in a vertical cross-section.
Figure 4:
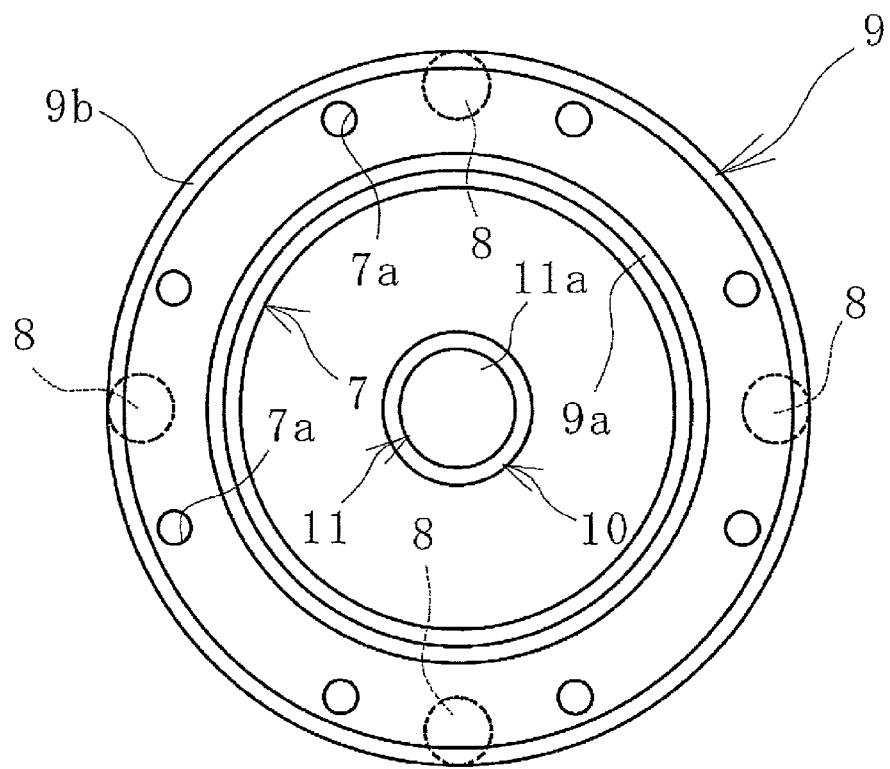
FIG. 4 is an explanatory diagram illustrating the manufacturing device of FIG. 3 in plan view.

As illustrated in FIG. 3 and FIG. 4, a manufacturing device 6 for manufacturing the bladder assembly 1 according to the present technology includes a base stage 7 installed on leg parts 8, and a support member 10 disposed in a central portion of the base stage 7 in plan view. The base stage 7 has a toric shape in plan view, with through holes 7a disposed at intervals in a circumferential direction. The number of the leg parts 8 is, for example, 3 or 4.

The base stage 7 and the support member 10 are configured to be able to move vertically relative to each other. In the present embodiment, a positioning plate 9 is removably attached to the top of the base stage 7. Projections that function as positioning parts 9a, 9b project upwards from the surface of the positioning plate 9. Furthermore, through holes are provided on the surface of the positioning plate 9 at the same positions as the through holes 7a. The positioning parts 9a, 9b can also be provided directly on the top surface of the base stage 7.

The positioning parts 9a, 9b are each toric projections that are formed concentrically, with a gap in the radial direction between one of the positioning parts 9a and the other of the positioning parts 9b. Although each of the positioning parts 9a, 9b is continuous in the circumferential direction, they may be formed intermittently.

The support member 10 according to the present embodiment is a fluid cylinder including a plurality of rods 10a, 10b with a telescopic structure that can extend and retract in the vertical direction. A support portion 11 is removably attached to an upper end portion of the support member 10. A projection that functions as a positioning part 11a projects upwards from the surface of the support portion 11. The positioning part 11a can also be provided directly on the upper end portion of the support member 10.

One example of steps of the method of manufacturing the bladder assembly 1 using the manufacturing device 6 will be described below.

Figure 5:
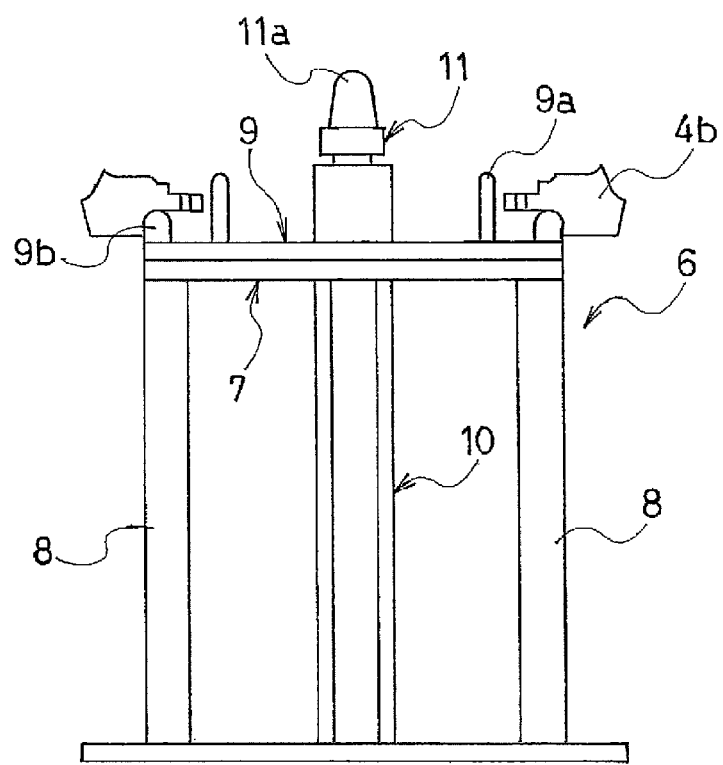
FIG. 5 is an explanatory diagram illustrating an outside ring member of a first ring part placed on a base platform as viewed in a vertical cross-section.

First, as illustrated in FIG. 5, the outside ring member 4b of the first ring part 4 is placed on the base stage 7. In this case, the outside ring member 4b is engaged with the positioning part 9b, so the outside ring member 4b is positioned in a predetermined location with respect to the base stage 7.

Figure 6:
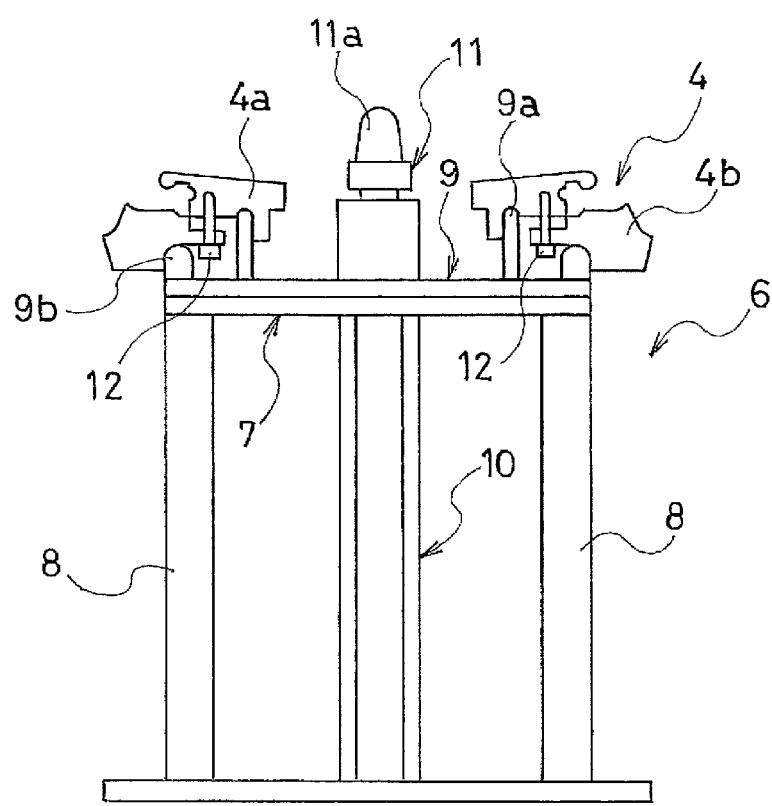
FIG. 6 is an explanatory diagram illustrating an inside ring member temporarily fixed to the outside ring member of FIG. 5 as viewed in a vertical cross-section.

Next, as illustrated in FIG. 6, the inside ring member 4a is placed on the base stage 7 with the inside ring member 4a being placed on top of the outside ring member 4b. In this case, the inside ring member 4a is engaged with the positioning part 9a, so the inside ring member 4a is positioned in a predetermined location with respect to the base stage 7. A hoist crane or the like is used to move the outside ring member 4b or the inside ring member 4a as necessary.

In this state, the fixing bolts 12 are inserted from below through the through holes 7a formed in the base stage 7 and the through holes formed in the positioning plate 9. In addition, the fixing bolts 12 are inserted from below through the through holes formed at intervals in the circumferential direction of the outside ring member 4b, screwed into bolt holes formed in the inside ring member 4a, and temporarily fixed. Note that engaging with the positioning parts 9a, 9b is convenient for positioning so that the positions of the through holes 7a of the base stage 7, the through holes of the positioning plate 9, the through holes formed in the outside ring member 4b, and the bolt holes formed in the inside ring member 4a coincide.

The lengths of the leg parts 8 are, for example, approximately 80 cm or greater and 120 cm or less, thereby ensuring a gap between the base stage 7 and the ground. Thus, an operator can easily carry out installation of the fixing bolts 12 using the gap between the ground and the base stage 7, without adopting an unreasonable attitude.

Figure 7:
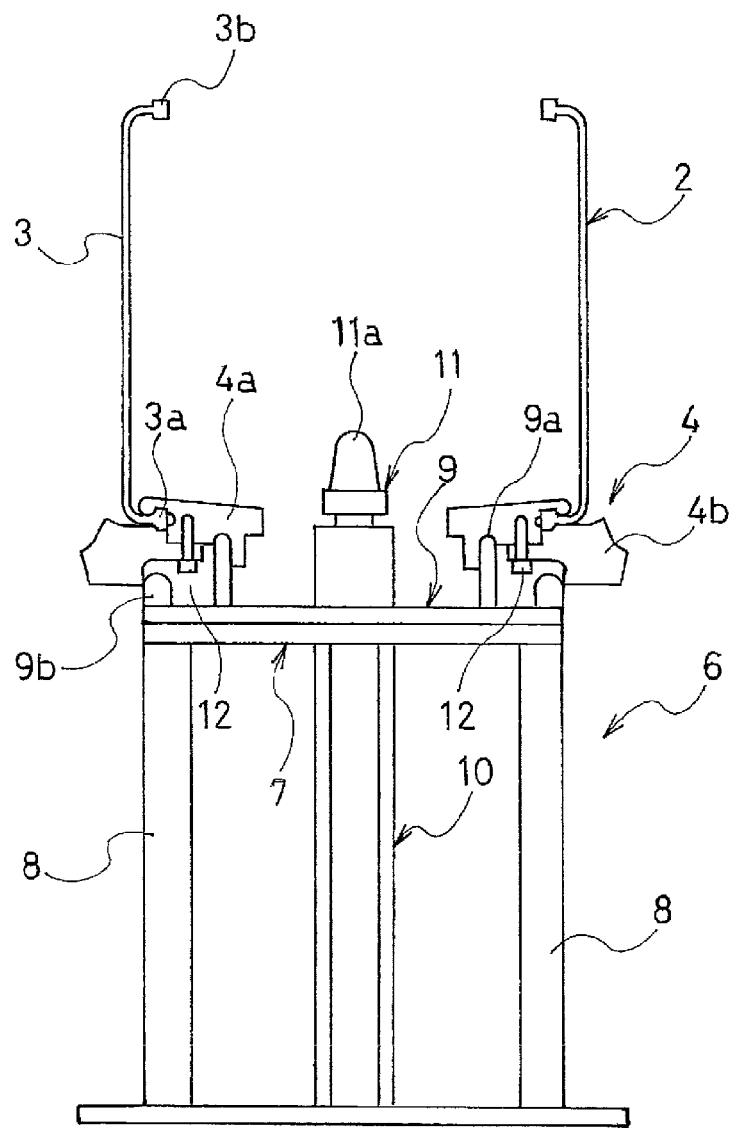
FIG. 7 is an explanatory diagram illustrating the first ring part of FIG. 6 installed on a first clamp part as viewed in a vertical cross-section.

Next, as illustrated in FIG. 7, the bladder 2 in an upright position with the first clamp part 3a on the lower side and the second clamp part 3b on the upper side is moved on to the base stage 7, and the first clamp part 3a is inserted into the gap between the inside ring member 4a and the outside ring member 4b. In this state, the fixing bolts 12 are further tightened, the first clamp part 3a is sandwiched by the first ring part 4, and the first ring part 4 is securely attached to the bladder 2. A hoist crane or the like is used to move the bladder 2 as necessary.

Figure 8:
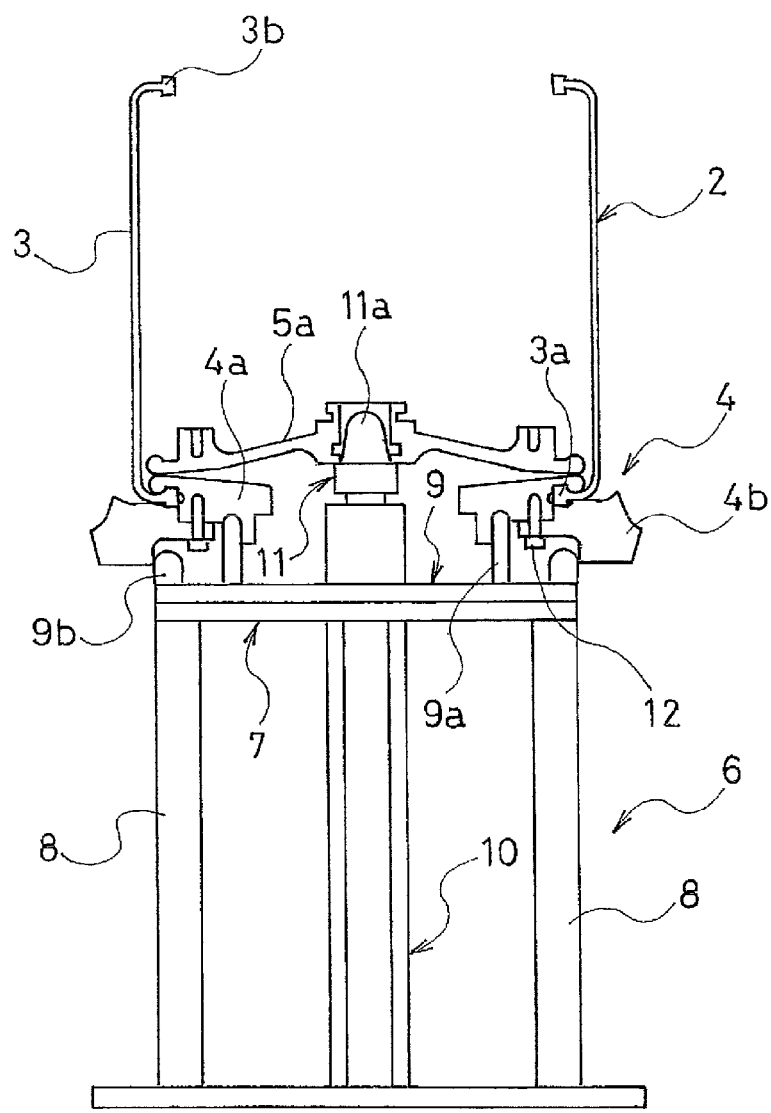
FIG. 8 is an explanatory diagram illustrating an inside ring member of a second ring part placed on the inside ring member of FIG. 7 as viewed in a vertical cross-section.

Next, as illustrated in FIG. 8, the inside ring member 5a of the second ring part 5 is inserted from above the bladder 2 and placed on the inside ring member 4a. In this case, the center portion in plan view of the inside ring member 5a is supported by the support member 10. Specifically, the center portion in plan view of the inside ring member 5a is engaged with the positioning part 11a formed on the support portion 11 and positioned at a predetermined location on the support member 10. A hoist crane or the like is used to move the inside ring member 5a as necessary.

Figure 9:
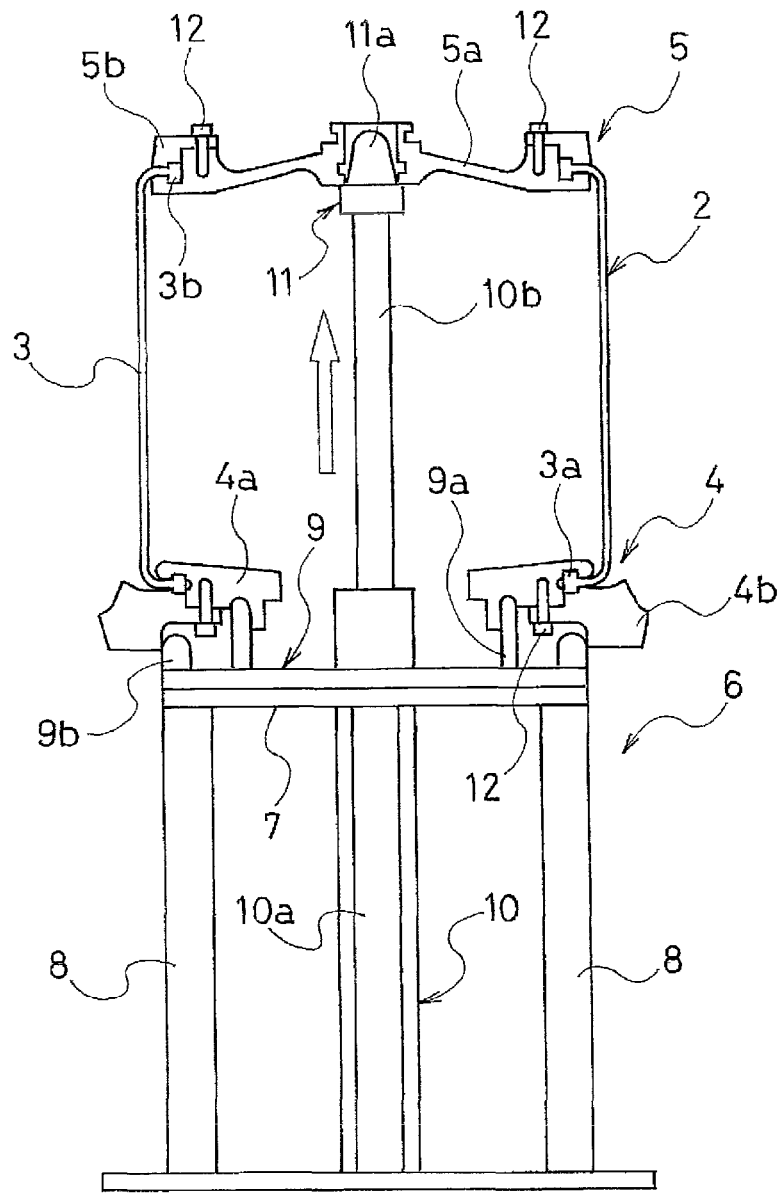
FIG. 9 is an explanatory diagram illustrating the second ring part placed on the second clamp part as viewed in a vertical cross-section.

Next, as illustrated in FIG. 9, the inside ring member 5a is moved upward relative to the bladder 2 and disposed at the position of the second clamp part 3b. In the present embodiment, the support member 10 is extended by moving the rod 10b of the support member 10 upward, so the inside ring member 5a supported on the support member 10 is moved upward relative to the bladder 2.

Next, the outside ring member 5b of the second ring part 5 is placed on the inside ring member 5a that is supported by the support member 10. Then, the second clamp part 3b is inserted into the gap between the inside ring member 5a and the outside ring member 5b. In this state, the operator inserts the fixing bolts 12 from above into the plurality of through holes formed at intervals in the circumferential direction of the outside ring member 5b, and screws the fixing bolts 12 into the bolt holes formed in the inside ring member 5a so that the inside ring member 5a and the outside ring member 5b are fixed together. In this way, the second clamp part 3b is sandwiched by the second ring part 5, the second ring part 5 is attached to the bladder 2, and the bladder assembly 1 is completed. The manufactured bladder assembly 1 is transported to the vulcanizer using a hoist screen or the like. Note that the reason the heads of the fixing bolts 12 are attached at the positions outside the bladder 2 is to prevent the heads of the fixing bolts 12 from contacting and damaging the bladder 2 when the bladder 2 is deflated.

As stated above, according to the present technology, the bladder assembly 1 can be manufactured with the first ring part 4 and the second ring part 5 attached to the first clamp part 3a and the second clamp part 3b respectively, without inverting the bladder 2 vertically. Thus, a mechanism for vertically inverting the bladder 2 and the large driving force for carrying out the vertical inversion are not necessary. As a result, it is not necessary to use large-scale equipment. Furthermore, the assembly and manufacturing operation is simple, and the time required for the operation can be reduced, so the productivity of the bladder assembly 1 can be improved.

In addition, the safety of the operation is improved because the operation of vertically inverting the bladder 2 is eliminated. It is also possible to avoid damaging the bladder 2 when carrying out the vertical inversion, which is advantageous in improving quality.

By providing the positioning part 11a on the support member 10, as in the present embodiment, the inside ring member 5a of the second ring part 5 can be positioned and placed at a predetermined location on the support member 10. The inside ring member 5a is stably supported, which is convenient for positioning so that the through holes formed in the outside ring member 5b and the bolt holes formed in the inside ring member 5a coincide.

The support portion 11 on which the positioning part 11a is formed is configured to be removable from the support member 10, so the optimum support portion 11 may be prepared for inside ring member 5a of each size (specification). In this way, when different sizes (specifications) of inside ring member 5a are used, the support portion 11 including a positioning part 11a appropriate for the inside ring member 5a may be installed on the support member 10.

The positioning plate 9 on which the positioning parts 9a, 9b are formed is configured to be removable from the base stage 7, so the optimum positioning plates 9 on which the optimum positioning parts 9a, 9b are formed may be prepared for first ring part 4 of each size (specification). In this way, when different sizes (specifications) of first ring part 4 are used, the positioning plate 9 on which appropriate positioning parts 9a, 9b for first ring part 4 are formed may be installed on the base stage 7.

Figure 10:
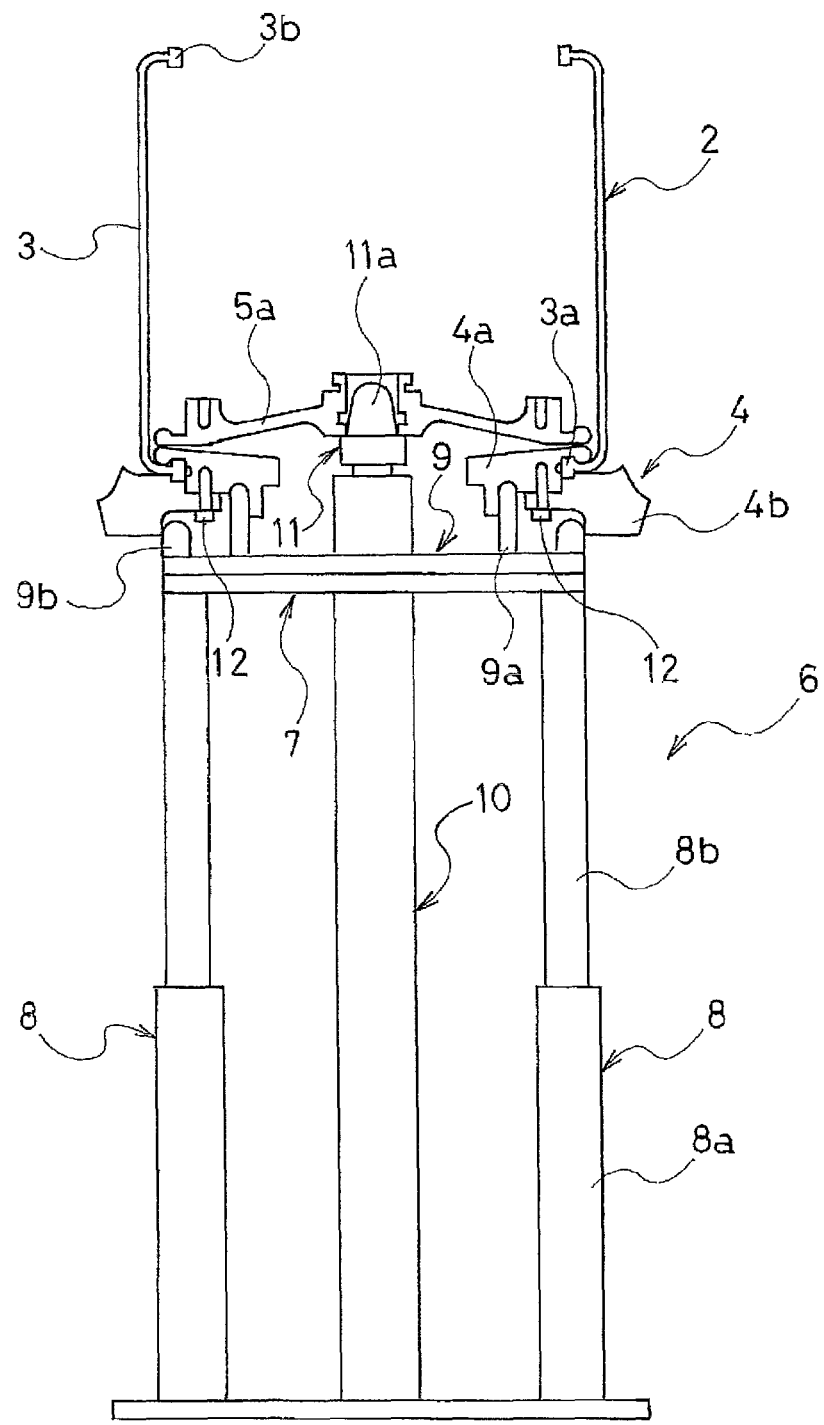
FIG. 10 is an explanatory diagram illustrating a vertical cross-sectional view of another embodiment of the manufacturing device with the inside ring member of the second ring part placed on the inner ring member of the first ring part, the first ring part being attached to the first clamp part.

FIG. 10 illustrates another embodiment of the manufacturing device 6 according to the present technology. The leg part 8 and the support member 10 are different from the embodiment described above, and the rest of the structure is substantially the same.

The leg parts 8 are fluid cylinders including a plurality of rods 8a, 8b with a telescopic structure that can extend and retract in the vertical direction. On the other hand, the support member 10 is a support post that does not extend or retract in the vertical direction.

The method of manufacturing the bladder assembly 1 using this manufacturing device 6 is the same as the steps illustrated in FIG. 5 to FIG. 8 for the previous embodiment. What differs is the step of moving the inside ring member 5a of the second ring part 5 from the state in FIG. 10 upward relative to the bladder 2 and disposing it at the position of the second clamp part 3b.

Figure 11:
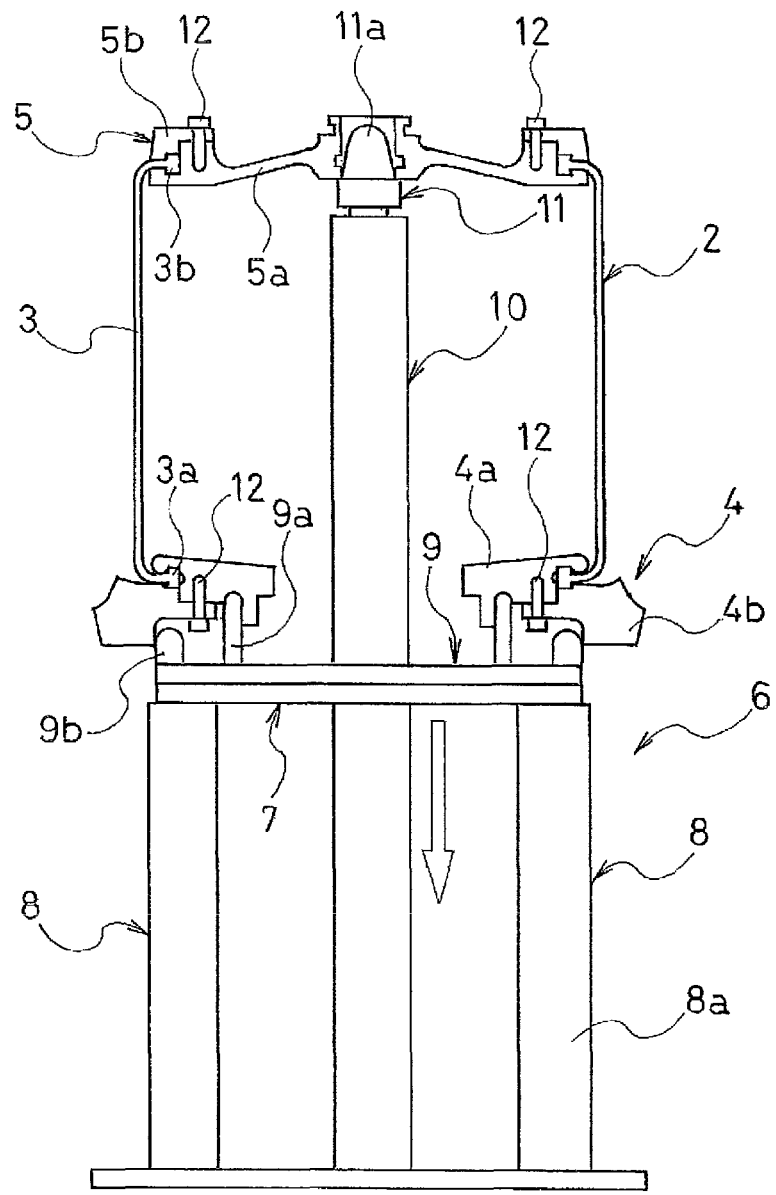
FIG. 11 is an explanatory diagram illustrating the second ring part placed on the second clamp part of FIG. 10 as viewed in a vertical cross-section.

In this step, as illustrated in FIG. 11, the inside ring member 5a of the second ring part 5 placed on the inside ring member 4a of the first ring part 4 is maintained in the position supported by the support member 10, and the leg parts 8 are retracted by moving the rods 8b of the leg parts 8 downward and the base stage 7 is thus moved downward. In this way, the inside ring member 5a is moved upward relative to the bladder 2. Thereafter, the steps are the same as the embodiment described above.

In this embodiment, the operation of inserting the fixing bolts 12 from below into the plurality of through holes formed at intervals in the circumferential direction of the outside ring member 4b, and screwing the fixing bolts 12 into the bolt holes formed in the inside ring member 4a, and the operation of inserting the fixing bolts 12 from above into the plurality of through holes formed at intervals in the circumferential direction of the outside ring member 5b and screwing the fixing bolts 12 into the bolt holes formed in the inside ring member 5a can be carried out at substantially the same height position. This is advantageous in reducing the labor required for the operation of screwing the bolts 12 by the operator.

The length of the leg part 8 in the extended state (the state illustrated in FIG. 10) is, for example, 80 cm or greater and 120 cm or greater, thereby ensuring a gap between the base stage 7 and the ground. In this way, the operator can easily carry out the operation of attaching the first ring part 4 to the bladder 2 by inserting the fixing bolts 12 through the through holes formed at intervals in the circumferential direction of the outside ring member 4b from below, and screwing the fixing bolts 12 into the bolt holes formed in the inside ring member 4a without adopting an unreasonable attitude.

The invention claimed is:

1. A method of manufacturing a tire vulcanization bladder assembly in which a first ring part including an inside ring member and an outside ring member is attached to a bladder for tire vulcanization by sandwiching a first clamp part formed in a periphery of a first end opening of the bladder with the first ring part, and a second ring part including an inside ring member and an outside ring member is attached to the bladder by sandwiching a second clamp part formed in a periphery of a second end opening of the bladder with the second ring part, the method comprising:
   placing the first ring part on a base stage installed on leg parts;
   attaching the first ring part to a first clamp part of the bladder, the bladder being in an upright position with the first clamp part on a lower side and a second clamp part on an upper side;
   inserting and placing the inside ring member of the second ring part into the bladder from above on the inside ring member of the first ring part;
   moving the inside ring member of the second ring part upward relative to the bladder such that it is disposed at a position of the second clamp part; and
   attaching the second ring part to the second clamp part.

2. The method of manufacturing a tire vulcanization bladder assembly according to claim 1, wherein the inside ring member of the second ring part placed on the inside ring member of the first ring part is supported by a support member, and is moved upward relative to the bladder by extending the support member upward.

3. The method of manufacturing a tire vulcanization bladder assembly according to claim 2, wherein when the inside ring member of the second ring part is supported by the support member, the inside ring member of the second ring part is positioned at a predetermined location of the support member by engaging with a positioning part provided on the support member.

4. The method of manufacturing a tire vulcanization bladder assembly according to claim 2, wherein when the first ring part is placed on the base stage, the first ring part is positioned at a predetermined position of the base stage by engaging with a positioning part provided on the base stage.

5. The method of manufacturing a tire vulcanization bladder assembly according to claim 3, wherein when the first ring part is placed on the base stage, the first ring part is positioned at a predetermined position of the base stage by engaging with a positioning part provided on the base stage.

6. The method of manufacturing a tire vulcanization bladder assembly according to claim 1, wherein the inside ring member of the second ring part placed on the inside ring member of the first ring part is supported by a support member, and is moved upward relative to the bladder by moving the base stage downward while maintaining a position of the support member.

7. The method of manufacturing a tire vulcanization bladder assembly according to claim 6, wherein when the inside ring member of the second ring part is supported by the support member, the inside ring member of the second ring part is positioned at a predetermined location of the support member by engaging with a positioning part provided on the support member.

8. The method of manufacturing a tire vulcanization bladder assembly according to claim 6, wherein when the first ring part is placed on the base stage, the first ring part is positioned at a predetermined position of the base stage by engaging with a positioning part provided on the base stage.

9. The method of manufacturing a tire vulcanization bladder assembly according to claim 1, wherein when the first ring part is placed on the base stage, the first ring part is positioned at a predetermined position of the base stage by engaging with a positioning part provided on the base stage.

10. A manufacturing device for manufacturing a tire vulcanization bladder assembly in which a first clamp part at a periphery of a first end opening of a tire vulcanization bladder is sandwiched by a first ring part that includes an inside ring member and an outside ring member to attach the first ring part to the bladder, and, a second clamp part formed at a periphery of a second end opening of the bladder is sandwiched by a second ring part that includes an inside ring member and an outside ring member to attach the second ring part to the bladder, the manufacturing device comprising:
   a base stage installed on leg parts; and
   a support member disposed in a central portion of the base stage in plan view; wherein
   the base stage and the support member are configured to be capable of moving vertically relative to each other,
   the first ring part placed on the base stage is attached to the first clamp part of the bladder, the bladder being in an upright position with the first clamp part on the a lower side and the second clamp part on an upper side,
   the inside ring member of the second ring part is placed on the inside ring member of the first ring part and supported by the support member,
   the inside ring member of the second ring part is moved upward relative to the bladder to a position of the second clamp part, and
   the second ring part is attached to the second clamp part.

11. The manufacturing device for manufacturing a tire vulcanization bladder assembly according to claim 10, wherein the support member is a structure configured to extend and retract in a vertical direction, and the inside ring member of the second ring part placed on the inside ring member of the first ring part is moved upward relative to the bladder by extending the support member upward.

12. The manufacturing device for manufacturing a tire vulcanization bladder assembly according to claim 11, wherein a positioning part configured to engage with the inside ring member of the second ring part is provided on the support member such that the inside ring member of the second ring part is positioned and placed at a predetermined position on the support member.

13. The manufacturing device for manufacturing a tire vulcanization bladder assembly according to claim 11, wherein a positioning part configured to engage with the first ring part is provided on the base stage such that the first ring part is positioned and placed at a predetermined position on the base stage.

14. The manufacturing device for manufacturing a tire vulcanization bladder assembly according to claim 12, wherein a positioning part configured to engage with the first ring part is provided on the base stage such that the first ring part is positioned and placed at a predetermined position on the base stage.

15. The manufacturing device for manufacturing a tire vulcanization bladder assembly according to claim 10, wherein the base stage is a structure configured to extend and retract in a vertical direction, and the inside ring member of the second ring part placed on the inside ring member of the first ring part is moved upward relative to the bladder by moving the base stage downward.

16. The manufacturing device for manufacturing a tire vulcanization bladder assembly according to claim 15, wherein a positioning part configured to engage with the inside ring member of the second ring part is provided on the support member such that the inside ring member of the second ring part is positioned and placed at a predetermined position on the support member.

17. The manufacturing device for manufacturing a tire vulcanization bladder assembly according to claim 15, wherein a positioning part configured to engage with the first ring part is provided on the base stage such that the first ring part is positioned and placed at a predetermined position on the base stage.

18. The manufacturing device for manufacturing a tire vulcanization bladder assembly according to claim 10, wherein a positioning part configured to engage with the first ring part is provided on the base stage such that the first ring part is positioned and placed at a predetermined position on the base stage.

* * * * *